UNITED STATES PATENT OFFICE.

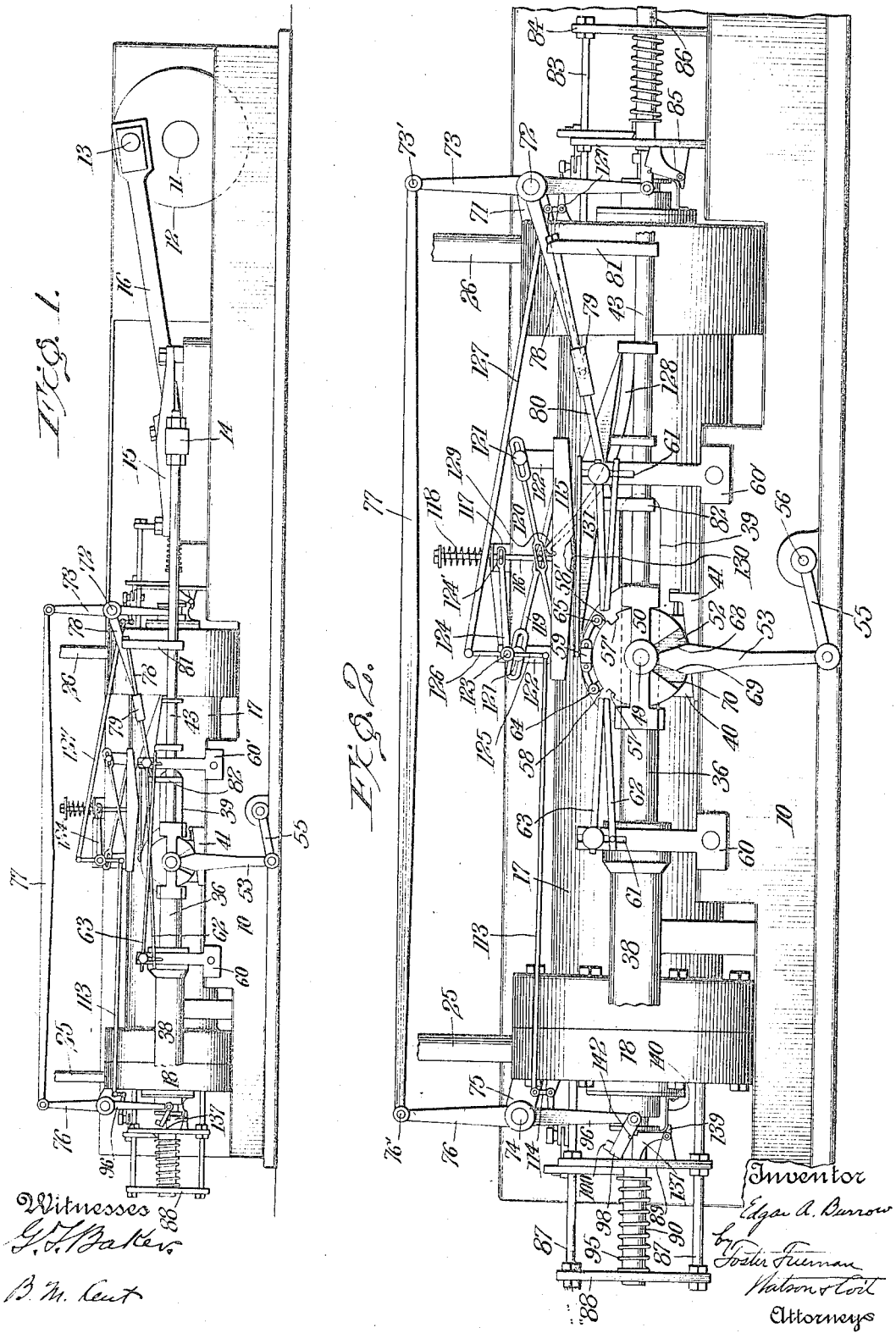

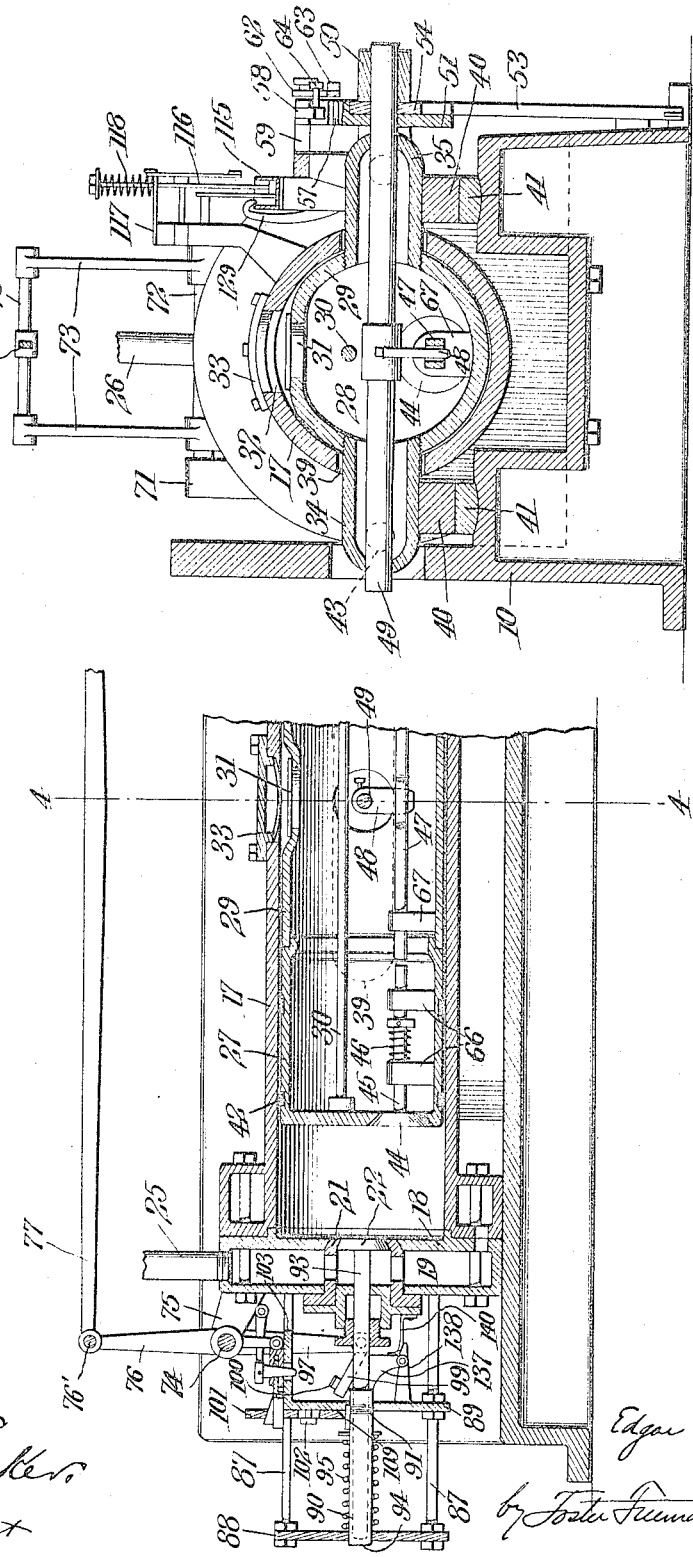

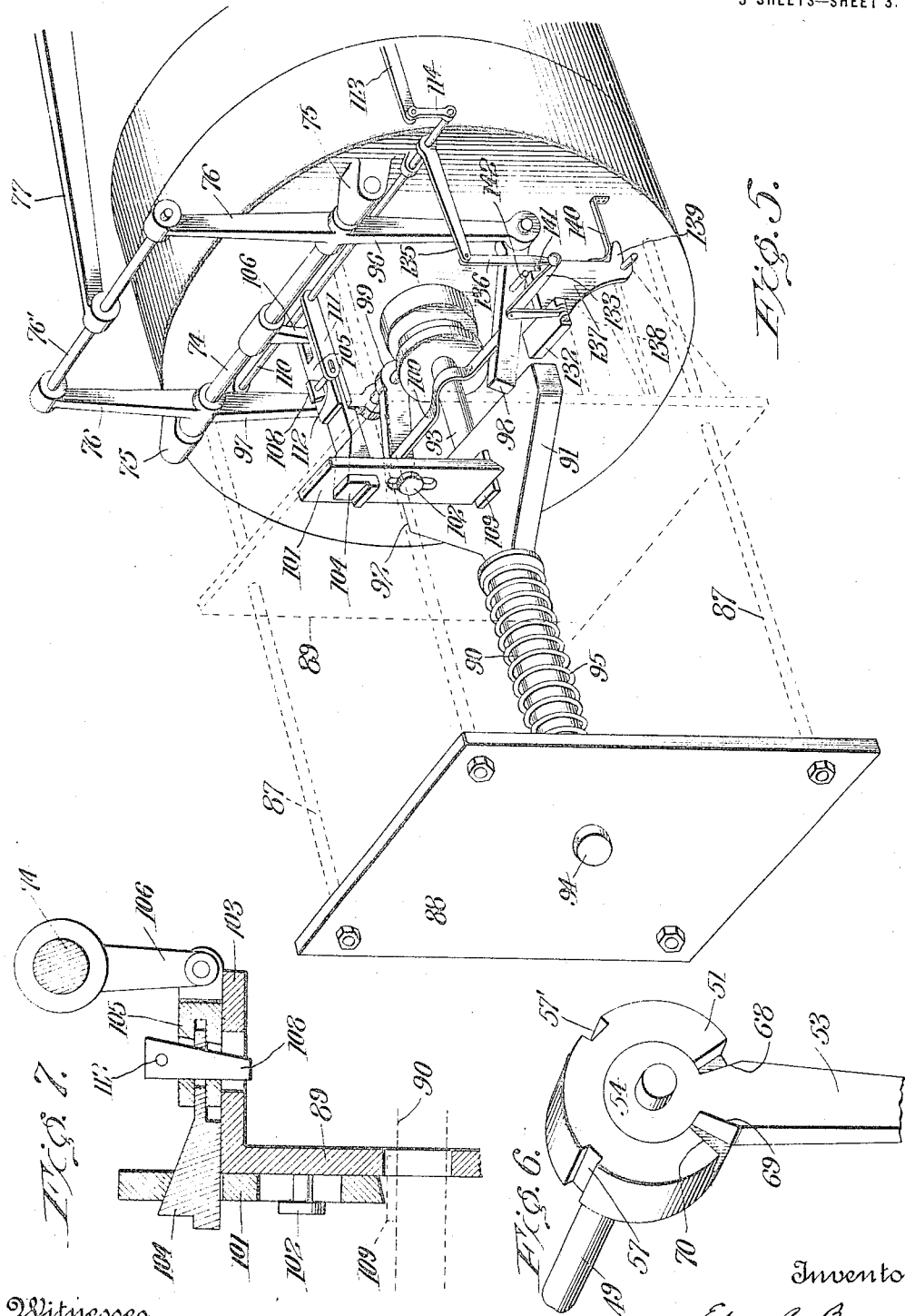

EDGAR A. BURROW, OF SAN ANGELO, TEXAS, ASSIGNOR, BY DIRECT AND MESNE ASSIGNMENTS, OF SEVENTY ONE-HUNDREDTHS TO HIMSELF AND THIRTY ONE-HUNDREDTHS TO BERNARD C. ALEXANDER AND MARY A. GUTHRIE, EXECUTRIX OF WILLIAM A. GUTHRIE, DECEASED.

VALVE-GEAR.

1,144,585.   Specification of Letters Patent.   Patented June 29, 1915.

Original application filed June 8, 1914, Serial No. 843,812. Divided and this application filed March 25, 1915. Serial No. 17,001.

*To all whom it may concern:*

Be it known that I, EDGAR A. BURROW, a citizen of the United States, residing at San Angelo, Tom Green county, State of Texas, have invented certain new and useful Improvements in Valve-Gears, of which the following is a specification.

This invention relates to engines generally and more particularly to steam engines and the present application is a division of my application Serial No. 843,812, filed June 8, 1914.

One of the objects of the invention is to provide a horizontally arranged cylinder in which the piston is supported out of contact with the bore of the cylinder so that there will be no wear on the cylinder by the piston and, as a result, the cylinder will remain true indefinitely and the usual leakage due to the cylinder being out of round will be avoided.

A further object is to provide an arrangement of inlet and exhaust valves which will permit the clearance to be reduced to a minimum.

A further object is to provide inlet and exhaust valve operating mechanism which shall be actuated directly by the movements of the engine piston and without using eccentrics or a lay shaft.

Other objects and the features of novelty will be apparent from the following description, taken in connection with the accompanying drawings, in which, Figure 1 is a side elevation of an engine embodying my invention; Fig. 2 is an enlargement of a part of Fig. 1; Fig. 3 is a vertical longitudinal section through one half of the engine cylinder; Fig. 4 is a transverse section on the line 4—4 of Fig. 3; Fig. 5 is a perspective view of one end of the cylinder and showing the inlet valve operating mechanism; Fig. 6 is a perspective view of a portion of the exhaust valve operating mechanism; and Fig. 7 is an enlarged section of the mechanism for varying the cut-off.

Referring to the drawings, 10 indicates the engine bed, 11 the crank shaft, 12 the crank disk having the crank pin 13 thereon. A cross head 14 is arranged in suitable guides 15 and connected with the crank pin 13 by the rod 16. The cylinder 17 is secured to the bed 10 in any suitable manner, and, in the form of the invention shown, is provided with a removable head 18. The head 18 is made hollow to provide the steam space 19 and the opposite end wall of the cylinder is provided with a corresponding steam space (not shown). A valve cage 21 is arranged in the head 18, preferably on the axis of the cylinder, and is provided with a seat for the puppet valve 22. The opposite end wall of the cylinder is provided with a similar valve cage having a valve (not shown), these valves controlling the supply of steam to the opposite ends of the cylinder. The steam spaces in the end walls of the cylinder may be supplied with steam in any suitable manner as by means of the pipes 25 and 26. Arranged in the cylinder is a piston, comprising the similar end sections 27 and 28 and an intermediate section 29. The sections may be clamped together in any suitable manner and for this purpose I have shown a rod or bolt 30 having right and left hand threads at its opposite ends. It will be observed that the piston is hollow and, in order to make the interior thereof accessible after the sections are assembled, I have provided the intermediate section with an opening at the top which is normally closed by a suitable cover plate 31. The cylinder 17 is provided with an opening 32, which registers with the opening in the piston when the piston is in its central position, and is closed by a cover plate 33.

The intermediate section 29 of the piston is provided with oppositely arranged laterally projecting tubular arms 34 and 35, each of which is provided with a longitudinal extension as indicated at 36, these extensions telescoping with the stationary tubular members as indicated at 38, the latter serving as exhaust pipes. The arms 34 and 35 extend through the longitudinal slots 39 in the cylinder walls and have secured on the under sides thereof feet 40, these feet having inclined lower surfaces which rest on wedge members 41, the latter sliding on suitable ways on the bed 10 and thus supporting the piston. From the drawings it will be seen that this construction permits the piston to be supported out of contact with the bore of the cylinder and the piston may therefore be made considerably smaller than the bore of the cylinder, leakage between the piston and the cylinder walls being prevented by the usual packing rings 42. The arms 34 and 35 have also connected therewith the rods 43 which are connected with the cross head 14, for the purpose of transmitting the motion of the piston to the cross head. It will be seen that by this construction the piston is connected with the cross head by means extending along the exterior of the cylinder, thereby avoiding the usual piston rod and stuffing box and permitting the arrangement of valves shown in the drawings.

The end walls of the piston carry the puppet exhaust valves 44, these valves being provided with stems 45 and being closed by means of spring 46. A reciprocating rod 47 is arranged between the ends of the valve stems 45 and is moved in either direction by an arm 48 on the shaft 49, this shaft extending transversely of the piston and being supported in the arms 34 and 35. One end of the shaft 49 extends considerably beyond the arm 35 and is supported in a suitable bearing in a bracket 50. Secured on the shaft 49 is a disk 51 having a sector-shaped recess 52 in one side thereof in which is arranged an arm 53 having a hub 54 loosely mounted on the shaft 49. The lower end of the arm 53 is pivotally connected with one end of a link 55, the opposite end of this link being mounted on a fixed pivot 56 of the bed 10. The disk 51 is provided with notches 57 and 57' in its periphery, these notches being adapted to receive latching pawls 58 and 58', respectively, which are pivotally mounted on a bracket 59.

Brackets 60 and 60' are secured to the bed 10 and provided at their upper ends with slots 61 in which are secured the opposite ends of the inclined bars 62 and 63, these bars being oppositely inclined and being engaged, respectively, by the rollers 64 and 65 on the pawls 58 and 58', respectively. The bars 62 and 63 are detachably secured to the brackets 60, so that the bars may be lifted manually to disengage either of the pawls from the notches 57.

The valve stems 45 are slidably arranged in brackets 66 on the interior of the piston and the rod 47 is slidably arranged in the brackets 67. In order to move the rod 47 back and forth to actuate the valves 44, alternately, the shaft 49 is automatically rocked at the ends of the strokes of the piston. The shaft 49 moves back and forth with the piston and the upper end of the arm 53, being loosely pivoted on the shaft 49 and having its lower end connected with the link 55, will be oscillated in synchronism with the strokes of the piston. It will be observed that the arm 53 is tapered at the upper end so that the sides 68 and 69 thereof are substantially radial with respect to the axis of the shaft 49. As the piston moves on the forward stroke, or toward the crank shaft, the side 69 of the arm 53 will engage the surface 70 of the sector-shaped recess 52 in the disk 51. This engagement occurs when the piston reaches a point well toward the end of its stroke and after the engagement occurs further movement of the piston will cause the shaft 49 to be rocked by the arm 53. The rocking of the shaft 49 causes the arm 48 to move the rod 47 toward the head end of the cylinder, thus opening the valve 44 in the head end of the piston and permitting the steam to exhaust into the interior of the piston, whence it escapes through the arms 34 and 35 to the exhaust pipes 38. The rocking of the disk 51, as above described, moves the notch 57 (see Fig. 2) into engagement with the pawl 58, this engagement occurring at the end of the forward stroke of the piston. As the piston reverses and moves, on the return stroke, toward the head end of the cylinder, the pawl 58 remains in engagement with the notch 57 and thus holds the disk 51 against rotation. This holds the valve 44, in the head end of the piston, in the open position until the piston approaches the head end of the cylinder. It will be noted that when the piston starts on the return stroke the side 69 of the arm 53 will move out of engagement with the side 70 of the recess 52 and the spring 46 acting on the stem of the open exhaust valve 44 will have a constant tendency to close the valve and shift the rod 47 to neutral position. As the piston moves on its stroke toward the head end of the cylinder the roller 64 engages the inclined bar 63 and at the proper instant the pawl 58 is disengaged from the notch 57, thereby releasing the disk 51 and permitting the spring 46 to close the valve 44. The continued movement of the piston after the valve 44 is closed causes the steam to be compressed in the space between the piston and the head end of the cylinder. The exhaust valve 44 in the crank end of the piston is operated in a similar manner.

Mounted in brackets 71 on the crank end of the cylinder is a rock shaft 72 having a pair of upwardly projecting arms 73, the upper ends of these arms being connected by a cross rod 73'. A rock shaft 74 is similarly mounted in brackets 75 on the head end of the cylinder and is provided with a pair of upwardly projecting arms 76 which carry a cross rod 76', the cross rods 73' and 76' being connected by a rod 77. The shaft 72 also has secured thereon an arm 78 which is pivotally connected with a sliding sleeve 79 on the inclined rod 80. The rod 80 is secured to brackets 81, 82 which are carried by the rod 43 so that the rod 80 moves back and forth with the rod 43.

Secured to the crank end of the cylinder are four rods 83, which support a plate 84, at their ends, and also a plate 85 substantially midway between the plate 84 and the end of the cylinder. A tubular member 86 is slidably mounted in the plates 84 and 85. At the head end of the cylinder are rods 87 similar to the rods 83 and supporting the plates 88 and 89, these plates being arranged similarly to the plates 84 and 85.

The valve operating mechanisms at the opposite ends of the cylinder are similar and since the mechanism at the head end of the cylinder is shown in detail in Fig. 5 a description thereof will be sufficient for an understanding of both these mechanisms. In Fig. 5 the plate 89 is indicated by dotted lines for the sake of clearness. A tubular member 90, similar to the member 86, is slidably arranged in the plates 88 and 89 and is provided with the laterally projecting wings 91 and 92. The stem 93 of the inlet valve 22 extends into the tubular member 90 and when the parts are in the position shown in Fig. 3 the end of the stem 93 is in engagement with the end wall 94 of the member 90. A spring 95 is arranged on the tubular member 90 between the plate 88 and the wings 91 and 92 and normally presses the tubular member toward the cylinder. The shaft 74 has secured thereon and projecting downwardly therefrom a pair of arms 96 and 97 and pivoted to the lower end of the arm 96 is an arm 98, a similar arm 99 being pivoted to the lower end of the arm 97. The arms 98 and 99 are connected by a cross member 100 and when the shaft 74 is rocked to carry the arms 98 and 99 toward the cylinder they drop into alinement with the wings 91 and 92, being supported in this position by the engagement of the member 100 with the valve stem 93. With the arms 98 and 99 in alinement with and engaging the wings 91 and 92, a movement of the rock shaft 74 to carry the arms 98 and 99 away from the cylinder will cause the member 90 to be moved away from the cylinder, thereby compressing the spring 95. It will be noted, however, that on account of the telescopical arrangement of the stem 93 and the member 90, the latter will be moved independently of the stem and without opening the valve 22, the latter being held against its seat by the pressure in the chamber 19.

Slidably mounted on the plate 89 is a latch member 101, this member being held in position in any suitable manner, as by the head of a bolt 102. The plate 89 is provided with a shelf 103 (see Fig. 7) extending horizontally toward the cylinder and on this shelf is slidably mounted a wedge member 104 which extends through a suitable opening in the latch member 101. A bifurcated arm 105 is pivotally connected at one end with an arm 106, which is secured on the shaft 74, and receives the inner end 107 of the wedge member 104. The arm 105 and the end 107 of the wedge member 104 are suitably slotted to receive a vertically adjustable wedge or key 108 which forms a connection between these parts. It will be readily understood that by vertically adjusting the wedge 108 the combined effective length of the parts 104 and 105, between the pivotal connection with the arm 106 and the latch member 101, may be varied. The member 90 carries on its upper surface a block 109 which coöperates with the member 101 to hold the member 90 against the pressure of the spring 95. When the member 90 is moved away from the cylinder the wedge member 104 is in position to permit the member 101 to drop in behind the block 109 and thus secure the member 90 in its outermost position.

As the piston moves toward the head end of the cylinder, after the valve 44 has been closed, the steam in the space between the piston and the head of the cylinder is compressed until a pressure is attained sufficient to overcome the boiler pressure on the back of the valve 22, when the latter will be opened. It will be observed that the cross sectional area of the stem 93 is subjected to atmospheric pressure and an annular area at the back of the valve is subjected to boiler pressure, so that when the valve 22 is opened and the boiler pressure equalizes on the opposite sides of the valve there will be an overbalancing pressure, on account of the area of the stem 93, tending to hold the valve open. It should be here noted that, on account of the arrangement of the valves 22 and 44, it is possible to move the piston to within a small fraction of an inch of the cylinder head and therefore the clearance space is, in this engine, reduced to a minimum. The provision of the exhaust valve 44 in the piston itself eliminates exhaust ports in the cylinder wall and thus avoids the clearance space due to exhaust ports, usually found in engines. As the piston moves away from the head end of the cylinder the inlet valve will remain open until the member 101 is lifted out of engagement with the block 109 to permit the spring 95 to move the member 90 toward the cylinder. The movement of the piston away from the head end of the cylinder causes the sleeve 79 to be lowered by the inclined bar 80 and thus rock the shafts 72 and 74. This rocking of the shaft 74 draws the wedge member 104 toward the cylinder and thus lifts the member 101 out of engagement with the block 109. The point at which the disengagement of the member 101 and block 109 occurs may be varied by adjusting the wedge 108 and for this purpose there is mounted on the cylinder head a shaft 110 having an arm 111 which is connected with a pin 112 on the wedge 108. By rocking the shaft 110 the wedge 108 may be raised or lowered and this rocking movement is effected by means of any suitable form of speed-governing mechanism.

In the drawings I have shown a governing mechanism for actuating the shaft 110 by means of a link 113 which is connected with an arm 114 on the shaft 110. The governing mechanism illustrated comprises a pan 115 which is secured on a vertical rod 116 passing through a bracket 117 and yieldingly supported on the bracket by means of a spring 118. In order to prevent the pan 115 from moving laterally I have provided links 119 and 120 which are pivoted to the opposite ends of the pan and have a pin and slot connection with the rod 116 and with pins 121 which are carried by fixed brackets 122. A rock shaft 123 is suitably supported in fixed brackets and has an arm 124 which has a pin and slot connection 124' with the rod 116, as shown. The rock shaft 123 is also provided with oppositely projecting arms 125 and 126, the arm 125 being connected with the link 113 and the arm 126 being connected with a similar link 127 which actuates a rock shaft 127', on the crank end of the cylinder, and the function of which is similar to that of shaft 110.

Secured on the rod 43 is a receptacle 128 for a fluid, such as mercury, and this receptacle has a tubular extension 129, the upper end of which is so arranged as to discharge the fluid into the pan 115. The parts are so arranged that with each movement of the piston from the head end of the cylinder the inertia forces acting on the mercury will cause the mercury to rise in the extension 129 to a height sufficient to discharge a portion thereof into the pan 115. The pan is provided with a restricted outlet 130 in the middle of the bottom and the mercury flows through this outlet into a funnel 131 which is carried by the rod 43 and returns the mercury to the receptacle 128. As the mercury accumulates in the pan 115 the pan is depressed and the shaft 123 rocked so as to lower the wedge 108 and thus shorten the effective length between the arm 106 and the wedge member 104, thereby causing the disengagement of the member 101 from the block 109 at an earlier point in the stroke of the piston, or, in other words, shortening the cut-off of the engine. When the speed of the engine becomes abnormally high, the amount of steam supplied to the cylinder will be greatly reduced by shortening the cut-off and the power applied to the crank shaft will be correspondingly reduced so as to restore the speed to normal. On the other hand, when the speed is below normal the mercury will flow through the opening 130 in the pan 115 faster than it is received from the receptacle 128 and this will permit the pan to be lifted by the spring 118 and thereby lengthen the cut-off. Under conditions of extremely high speed it is desirable to prevent the inlet valves being held open and for this purpose I have provided a block 132 which is supported in any suitable manner and adapted to be moved by a bell crank 133 which has a fixed pivot 134 and is actuated by an arm 135 on the shaft 110, the arm 135 being connected with the bell crank by a link 136. This device is shown diagrammatically in Fig. 5, but its operation will be readily understood and is as follows: On excessive speeds the block 132 is moved to a position below the arm 98 where it will prevent the arms 98 and 99 from dropping into alinement with the wings 91 and 92. Under these conditions the arms 98 and 99 will move back and forth without actuating the member 90 and no steam will be supplied to the cylinder.

In order to permit the spring 95 to return the member 90 and close the inlet valve, it is necessary to lift the arms 98 and 99 out of engagement with the wings 91 and 92 when the member 90 has been moved away from the cylinder the proper distance and to accomplish this result I have provided the triangular members 137 which are pivotally mounted on brackets 138 and provided with toes 139 which are engaged by springs 140, these springs tending to swing the upper ends of the members 139 toward the cylinder. As shown in the drawings, the members 137 are provided with notches 141 in their upper surfaces and these notches receive laterally projecting pins 142 on the arms 98 and 99, when the latter are moved to their limiting position toward the cylinder. The springs 140 are so arranged as to normally hold the members 137 in the position shown in Fig. 5. With the pins 142 in the notches 141, the movement of the arms 98 and 99 away from the cylinder will swing the members 137 against the tension of the springs 140 and at a certain point in the movement of the arms 98 and 99 the pins 142 will move out of the notches 141 and the springs 140 will then return the members 137 to their original position, the upper surfaces of these members acting as cams which lift the pins 142 and the members 98 and 99 so as to disengage the latter from the wings 91 and 92. This, of course, occurs after the member 101 has dropped in behind the block 109 so as to retain the member 90 in its outer position.

It is believed that the detailed description of the operation of the various mechanisms, above described, will make the operation of the engine as a whole apparent.

It will be understood by those skilled in the art that various features of the engine shown and described herein are applicable to air compressors, ammonia pumps, compressors, internal combustion engines, etc., and therefore the term "engine" as used in the claims is to be given its broadest significance.

No claims are made in the present application to the governing mechanism shown and described, this forming the subject matter of my application Serial No. 17,494 filed March 27, 1915.

Having thus described the invention, what is claimed and desired to be secured by Letters Patent is:

1. In an engine, the combination of a cylinder, a piston therein, an arm secured to the piston and projecting through the side wall of the cylinder, a reciprocable member connected with said arm, a shaft carried by said arm, an exhaust valve carried by the piston, means operatively connecting said shaft with said exhaust valve, an arm loosely mounted on said shaft, means connected with the last-mentioned arm and adapted to cause it to be oscillated by the reciprocation of the piston, a member secured on said shaft and intermittently engaged by the last-mentioned arm to rock said shaft, latching means for holding said shaft at the ends of its rocking movements, means for releasing said latching means, an inlet valve in the end wall of the cylinder, actuating means for said inlet valve comprising a rock shaft, a member carried by the first-mentioned member and having a surface inclined with respect to the plane of reciprocation thereof, and means coöperating with said inclined surface and moved thereby to actuate the last-mentioned rock shaft.

2. In an engine, the combination of a cylinder, a piston in the cylinder, an exhaust valve carried by the piston, a rock shaft carried by the piston, means operatively connecting said rock shaft with said valve, an oscillating arm loose on said shaft, a member secured on said shaft and adapted to be positively engaged by said arm to actuate said shaft to open said valve, a latch device engaging said member to hold said valve in the open position, and cam means for releasing said latch device to permit the valve to close.

3. In an engine, the combination of a cylinder, a piston therein, an inlet valve, actuating means for said inlet valve comprising a stem secured to the valve, a member telescopically connected with said stem, a spring for moving said member in one direction, and means actuated by the piston for moving said member in the opposite direction.

4. In an engine, the combination of a cylinder, a piston therein, a valve for controlling the supply of motive fluid to the cylinder, a stem secured to said valve, a member adapted to positively engage said stem to move said valve to the closed position, means actuated by the piston for moving said member away from said stem, spring means for moving said member in the opposite direction to close said valve, and an automatically operating latch for holding said member in the position to which it is moved by the said piston actuated means.

5. In an engine, the combination of a cylinder, a piston therein, a valve for controlling the supply of motive fluid to the cylinder, a member for actuating said valve in one direction, means actuated by said piston for setting said member into position to operate the valve, a latch for holding said member in the set position, and means for releasing said latch.

6. In an engine, the combination of a cylinder, a piston therein, a valve for controlling the supply of motive fluid to the cylinder, a member for actuating said valve in one direction, piston actuated means for setting said member into position to operate the valve, a latch for holding said member in the set position, and means controlled by the speed of the engine for releasing said latch.

7. In an engine, the combination of a valve for controlling the supply of motive fluid, a member movable in one direction to actuate said valve, a rocker arm, means actuated by the piston for moving said arm, an arm pivoted to said rocker arm and adapted to engage said member and move the latter in the direction opposite to that for actuating the valve, a latch for holding said member at the limit of its movement by said arm, and means controlled by the speed of the engine for releasing said latch.

8. In an engine, the combination of a supply valve, a member for actuating said valve, spring means for moving said member to actuate said valve, means operated by the piston for moving said member in opposition to said spring means, a latch for holding said member at the limit of its movement by said last mentioned means, a member actuated by the piston for releasing said latch, and means controlled by the speed of the engine for adjusting the last-mentioned means to vary the time of release of said latch.

9. In an engine, the combination of a valve, means for actuating said valve comprising a rock shaft, a reciprocating member having a surface inclined with respect to its plane of reciprocation, a member engaging said inclined surface and actuated thereby, and means operatively connecting said member with said shaft.

In testimony whereof I affix my signature in presence of two witnesses.

EDGAR A. BURROW.

Witnesses:
R. A. WEAVER,
WYNN HAMILTON.